(12) United States Patent
Tiefenbrunn et al.

(10) Patent No.: US 11,168,735 B2
(45) Date of Patent: Nov. 9, 2021

(54) SWIVEL BALL HEAD MOUNT (71) Applicants: Larry J Tiefenbrunn, East Brunswick, NJ (US); Merin Swasey, North Logan, UT (US)

(72) Inventors: Larry J Tiefenbrunn, East Brunswick, NJ (US); Merin Swasey, North Logan, UT (US)

(73) Assignee: Larry J. Tiefenbrunn, Edison, NJ (US)

(*) Notice: Subject to any disclaimer, the term of this patent is extended or adjusted under 35 U.S.C. 154(b) by 527 days.

(21) Appl. No.: 16/122,864

(22) Filed: Sep. 5, 2018

(65) Prior Publication Data
US 2019/0093702 A1 Mar. 28, 2019

Related U.S. Application Data

(60) Provisional application No. 62/564,258, filed on Sep. 27, 2017.

(51) Int. Cl.
*F16C 11/10* (2006.01)
*G03B 17/56* (2021.01)
*F16C 11/06* (2006.01)

(52) U.S. Cl.
CPC ........ *F16C 11/106* (2013.01); *F16C 11/0623* (2013.01); *G03B 17/561* (2013.01)

(58) Field of Classification Search
USPC .......................... 403/90; 396/428; 248/187.1
See application file for complete search history.

(56) References Cited

U.S. PATENT DOCUMENTS

| | | | | |
|---|---|---|---|---|
| 4,214,724 A | * | 7/1980 | Geiger | F16M 11/14 248/167 |
| 5,471,272 A | * | 11/1995 | Bucolo | G03B 17/38 396/502 |
| 2011/0129210 A1 | * | 6/2011 | McGucken | G06Q 99/00 396/422 |
| 2015/0351531 A1 | * | 12/2015 | Dalton | F16M 11/14 248/558 |
| 2016/0105047 A1 | * | 4/2016 | Cui | H02J 7/0044 320/115 |
| 2016/0259374 A1 | * | 9/2016 | Breiwa | B60R 11/02 |

* cited by examiner

*Primary Examiner* — Clayton E. LaBalle
*Assistant Examiner* — Warren K Fenwick
(74) *Attorney, Agent, or Firm* — Henry I. Schanzer (57) ABSTRACT

A swivel ball head mount embodying the invention includes a swivel ball and a housing and a push button operated clamping mechanism coupled between the ball and the housing to control their relative movement. The clamping mechanism may include a gearing arrangement or a spring arrangement producing a mechanical advantage enabling the push button mechanism to operate the clamping mechanism using a single finger. Swivel ball head mount embodying the invention are adapted to have a camera mounted on the housing.

20 Claims, 11 Drawing Sheets

SWIVEL BALL HEAD MOUNT

This invention claims priority based on a provisional application bearing Ser. No. 62/564,258 titled IMPROVED SWIVEL BALL MOUNT filed Sep. 27, 2017 whose teachings are incorporated herein by reference.

BACKGROUND OF THE INVENTION

This invention relates to an improved camera swivel ball head mount control system.

Swivel ball head mounts for camera systems are known. These systems allow photographers or videographers to mount their cameras and lock them in position for capturing a desired scene. Swivel ball head mounts enable increased stability and provide faster, more accurate rotation for the photographer using fewer parts and a much simpler mechanism. However known swivel ball head mounts have significant problems.

Figure 1:
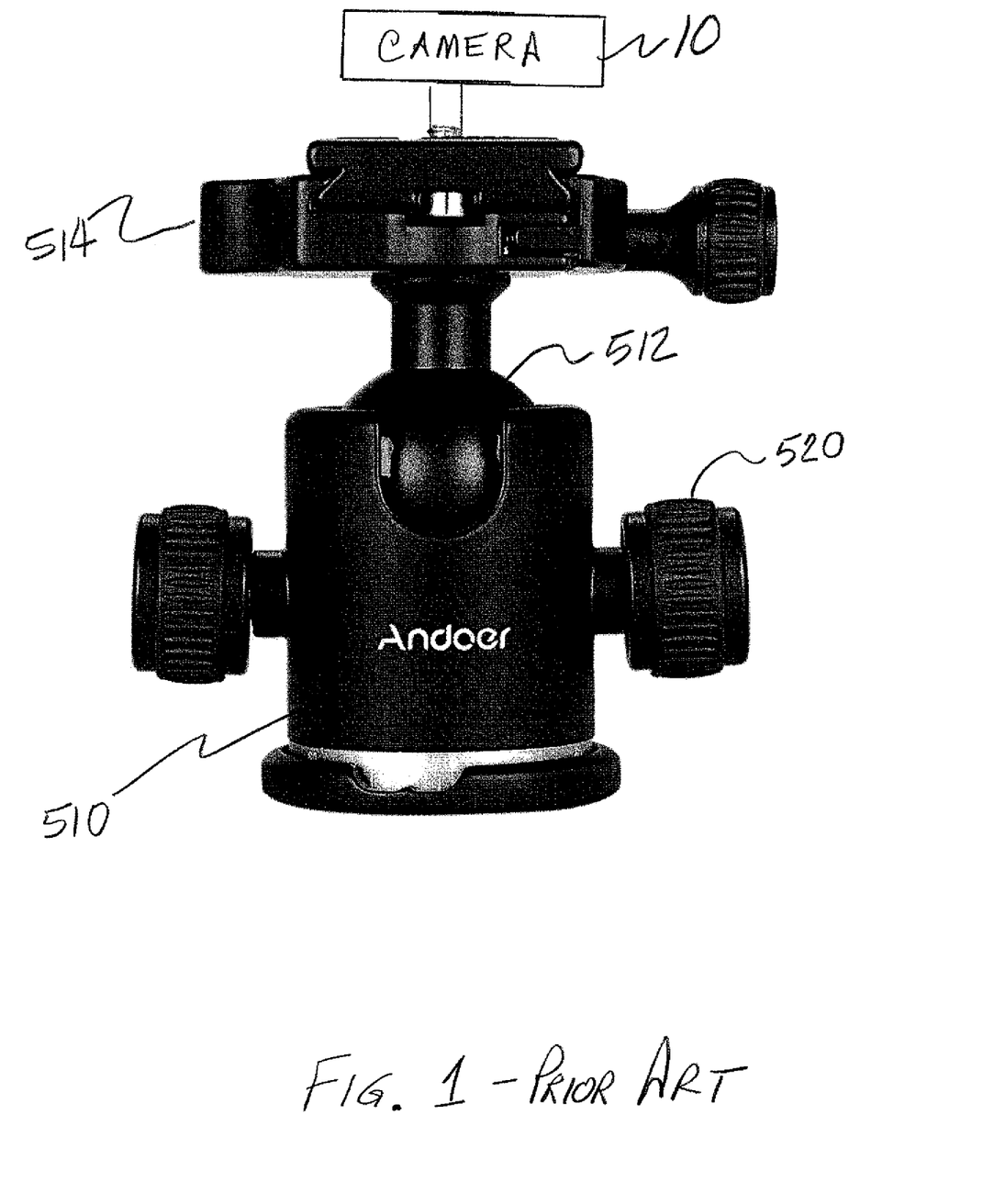
FIG. 1 is a photograph of a prior art swivel ball head mount for camera systems.

Referring to FIG. 1 there is shown a view of a prior art base (510) on, or within, which is mounted a swivel ball (also referred to herein as a "ball joint" or "ball") 512 and a camera mount 514. In addition, there is shown the outline of a camera 10 to be mounted on and above the camera mount. The swivel ball head 512 enables the camera to be rotated and tilted to a desired setting. Once the desired setting is obtained, a setting knob screw 520 is turned in one direction (e.g., clockwise) to apply mechanical pressure (directly or indirectly) against the ball joint to prevent it from moving (i.e., the ball joint is locked in place) relative to the base 510. The setting knob may then be turned in the opposite direction (e.g., counter-clockwise) to loosen the ball joint and allow it to move relative to the base.

A problem with the prior art system is that two hands are required in order to turn the knob 520 to lock the ball joint and the associated camera 10 and camera mount in place. One hand is needed to hold the camera to prevent its movement and the other hand to turn the screw knob. Another issue is that some specified minimum pressure has to be applied to ensure that the ball and base remain clamped to each other for extended periods of time to counteract the force due to the weight of a mounted camera. Using a knob screw (e.g., 520) to provide the specified minimum pressure/force for clamping (and unclamping) typically requires a user to grip the knob screw with a full hand to lock and unlock the ball and base. Thus, the need for two hands and the need to exercise significant force presents problems to a user.

There are other problems with the prior art setting knobs 520. For instance, these screw knobs protrude from the base posing unwieldy projection problems requiring, for example, extra space for fitting in camera carrying bags. Thus, there are operational and structural problems with the prior art control of a swivel ball head mount intended for use with a camera.

BRIEF SUMMARY OF THE INVENTION

The problems discussed above are resolved in improved swivel ball head mounts embodying the invention. A swivel ball head mount embodying the invention includes a swivel ball and a housing and a clamping mechanism coupled between the ball and the housing to control their relative movement, where the clamping mechanism is controlled by a lock/unlock mechanism which can be operated by a single finger. The lock/unlock mechanism may include push buttons, or any like control element, which can be operated (e.g., pushed, triggered or switched) with just one finger of a hand.

In one embodiment of the invention, the clamping mechanism includes a gearing mechanism responsive to activation by a lock/unlock mechanism to produce a mechanical advantage which enables a single finger to supply the sufficient force needed to lock (clamp) or unlock (release) a swivel ball relative to the housing to which it is mechanically coupled.

A clamping mechanism embodying the invention is designed to selectively lock or unlock (release) a swivel ball relative to a swivel ball housing, where the ball and its housing are adapted to be used as a mount, or support, for a camera.

In one embodiment of the invention the clamping mechanism includes lock/unlock push buttons which can be pushed (repeatedly or progressively) by a single finger of one hand to control the clamping mechanism to either: (a) gradually tighten and eventually lock (clamp) the swivel ball in place relative to the housing; or (b) gradually unlock (release) the ball housing relative to the swivel ball so the ball and housing can rotate or tilt freely relative to each other. Thus, the clamping mechanism includes push buttons and a gearing mechanism to enable variable and continuous control of the degree of clamping using a single finger.

In embodiments of the invention push buttons designed to activate the clamping mechanism are located relatively flush with the external surface of the housing to provide a relatively smooth contour with the external housing surface thus avoiding the sharp protrusions of the prior art. These push buttons enable a finger to apply a force in contrast to prior art systems which rely on twisting a knob or turning a wheel or hand gripping. Thus, in accordance with the invention, the knob screw of the prior art is replaced with a clamping mechanism which enables operation with a single finger.

Also, in accordance with the invention all the components of the clamping mechanism (except for the push buttons which are generally formed flush with the outer wall of the housing) are contained within the housing.

Other embodiments of the invention may include spring loaded push button lock/release mechanisms which can be activated with one finger.

BRIEF DESCRIPTION OF THE DRAWINGS

In the accompanying drawings which are not drawn to scale, like reference characters denote like components, and.

DESCRIPTION OF THE INVENTION

Referring to FIGS. 2A-2F and 3 there is shown a swivel ball head mount 100 which includes a housing 18 and a spherical swivel ball 20. The swivel ball head mount 100 is intended to provide support for a camera system 10 and to enable the camera 10 to be rotated and tilted. In the embodiment shown in FIGS. 2A-2F and 3, spherical swivel ball 20, which may be of plastic or metal, is mounted on a stem 21 which rests on a base plate 22. The ball 20, the stem 21 and the base plate 22 may be formed as a single unit or as separate components which are then combined. Swivel ball 20 allows users to position the housing, and any camera mounted on the housing, to any selected position. Pedestal 21 and base plate 22 provide support for ball head 20 and enable a user to mount the assembly 18 to a tripod or to any suitable device. In the discussion to follow and in the appended claims the term "ball" refers to a component such as spherical swivel ball 20 shown in these figures.

The ball housing 18 has an opening adapted to receive ball 20 which extends within the interior of housing 18. In the embodiment shown in these figures the housing 18 overlies the ball 20 and is mounted so it can swivel about ball 20. The housing 18 and ball 20 are mechanically coupled to each other such that the housing can be rotated and tilted (swiveled) about the ball head 20 to any desired position and then locked (clamped) in the desired position by means of a novel clamping mechanism operated by a lock button 88a which can be operated with one finger pushing on the lock button. The housing 18 can be released (unlocked or unclamped) by operating the novel clamping mechanism via a release (unlock) button 88b which can also be operated with one finger pushing on the release button. In the discussion to follow and in the appended claims the term "housing" refers to a part containing ("housing") components of the type shown in the Figures and the term "clamping mechanism" refers to components generally contained within the housing and which are coupled between the ball 20 and the housing 18 to control the clamping (locking) together of the ball and housing or their release so the are free to rotate relative to each other.

Figures 2A, 2B:
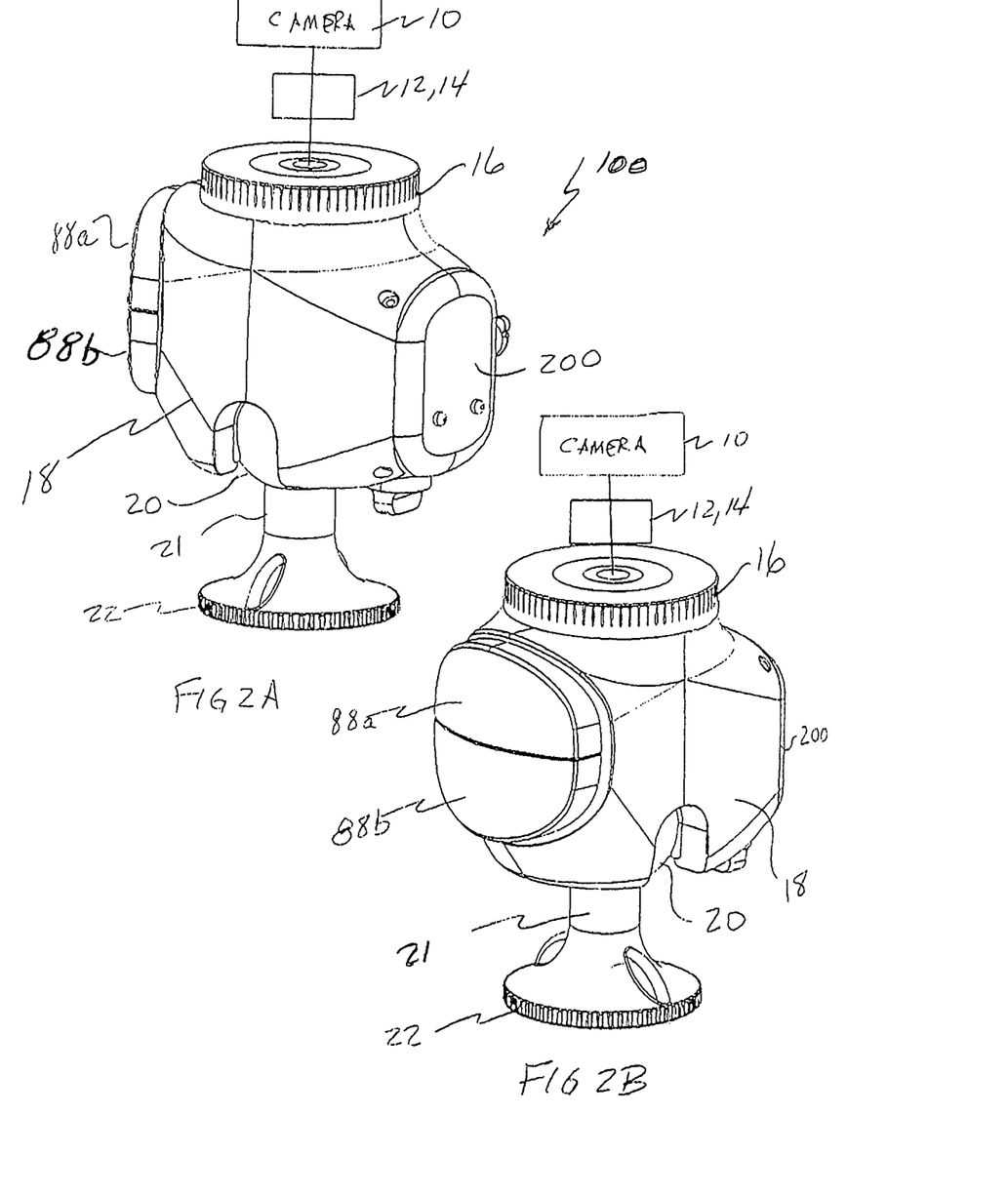
FIG. 2A and FIG. 2B are isometric representative drawings of two different views of a swivel ball head mount embodying the invention intended to be coupled to, and support, a camera.

In FIGS. 2A and 2B a rotatable panning mechanism 16 is mounted on top of the housing 18 and is secured thereto. A camera 10 can be mounted on top of panning mechanism 16 and secured thereto via a base plate 12 and a clamp 14 connected to the panning mechanism 16 which is attached to the top of the housing 18. Panning mechanism 16, located between the camera 10 and the housing 18, enables the camera to be set at a fixed viewing angle and to then be rotated 360 degrees relative to the housing 18.

Figure 2C:
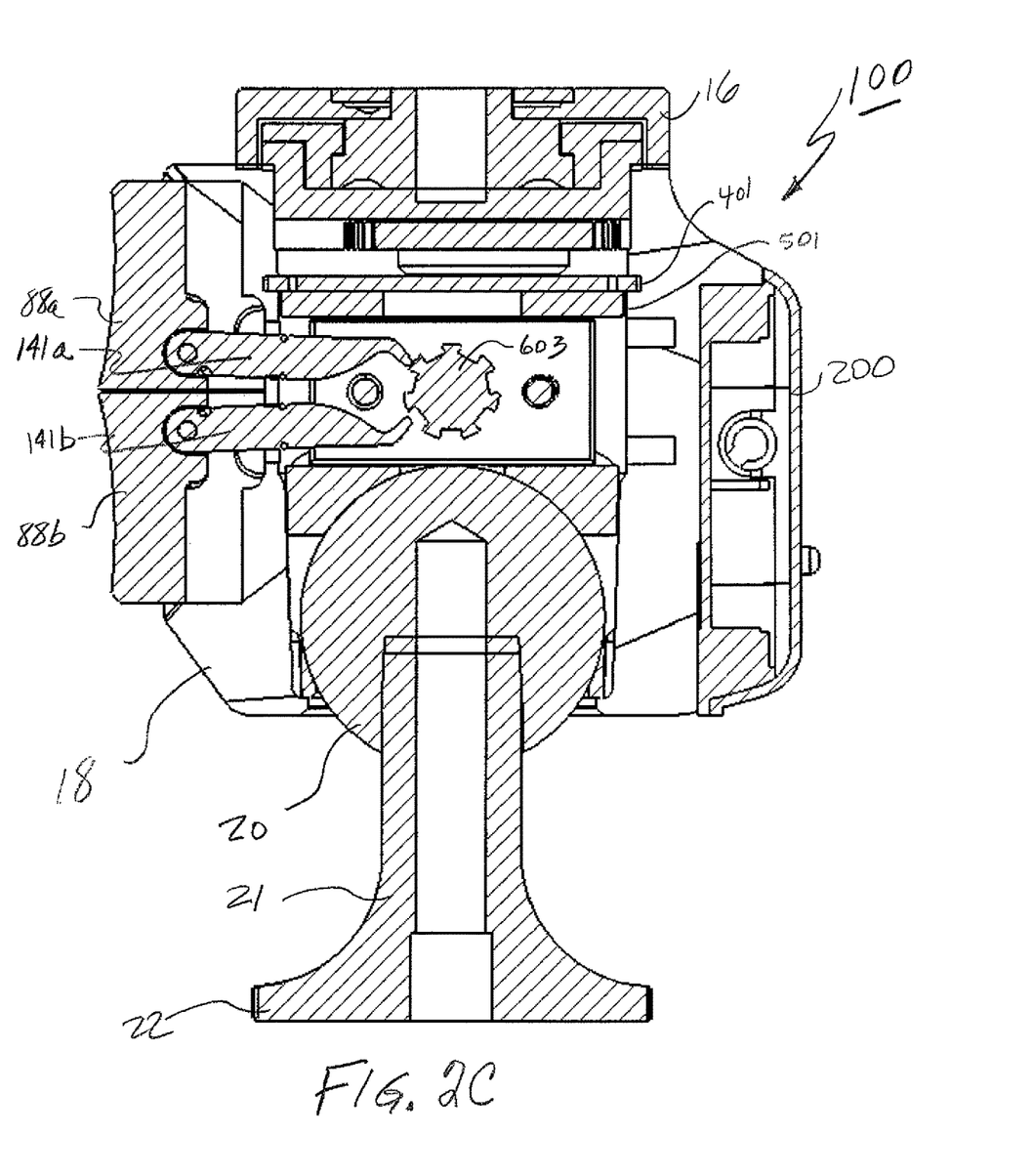
FIG. 2C is a simplified cross sectional representative diagram of a swivel ball head mount with a pawl and ratchet arrangement embodying the invention.

Referring to FIGS. 2A, 2B and 2C there is shown a push button 88a which, when pushed, functions to control the clamping mechanism to selectively, gradually, and controllably tighten and lock the housing 18 to the ball 20 and a push button 88b which, when pushed, functions to control the clamping mechanism to selectively, gradually, and controllably release and unlock housing 18 relative to the ball 20. Push buttons 88a, 88b extend along an outer surface of housing 18. They are designed to provide a relatively smooth contour to the outer surface of housing 18, in contrast to the protruding control knob 520 of FIG. 1.

Figure 2D:
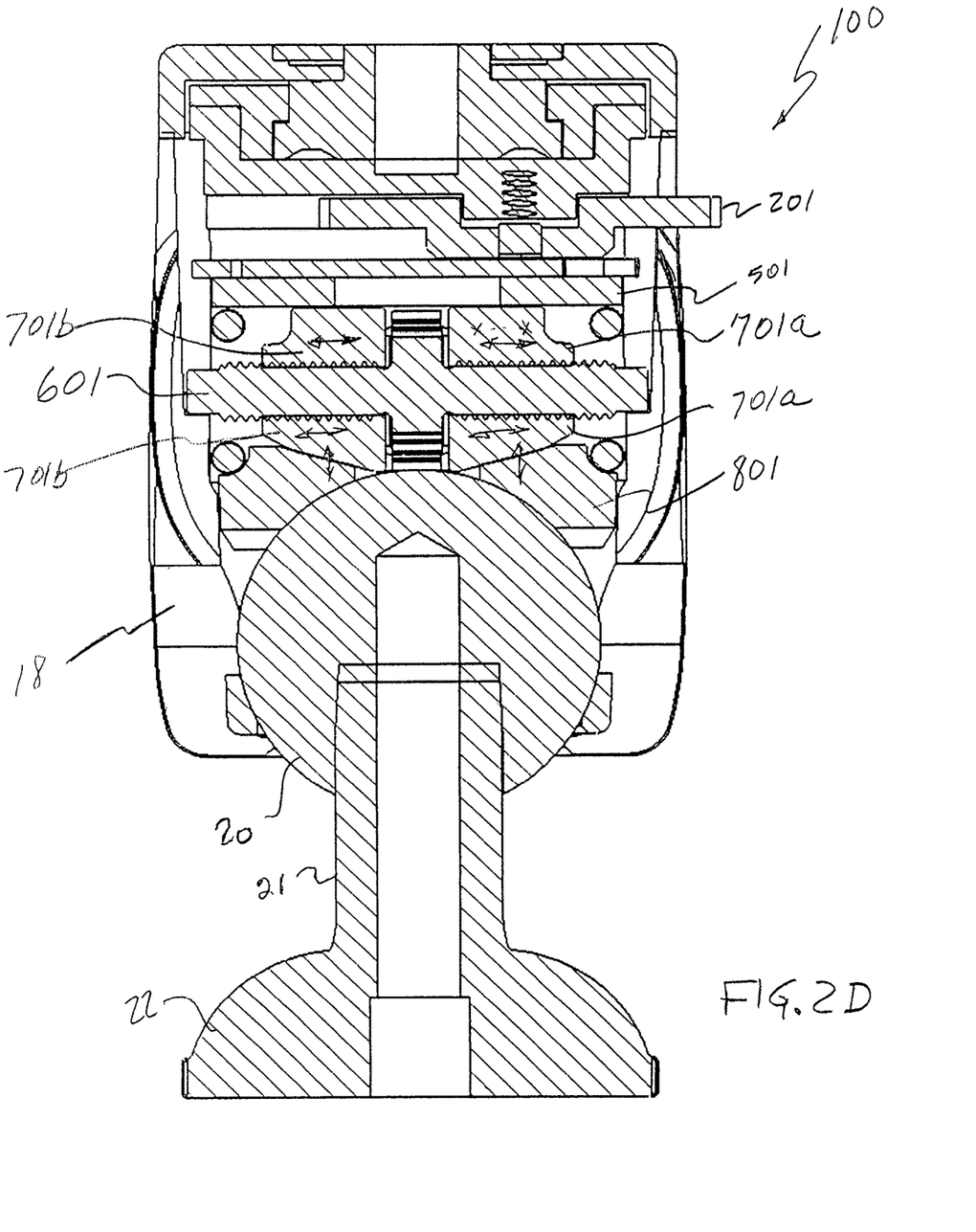
FIG. 2D is a simplified cross sectional diagram extending in a perpendicular direction to that shown in FIG. 2C.
Figure 2E:
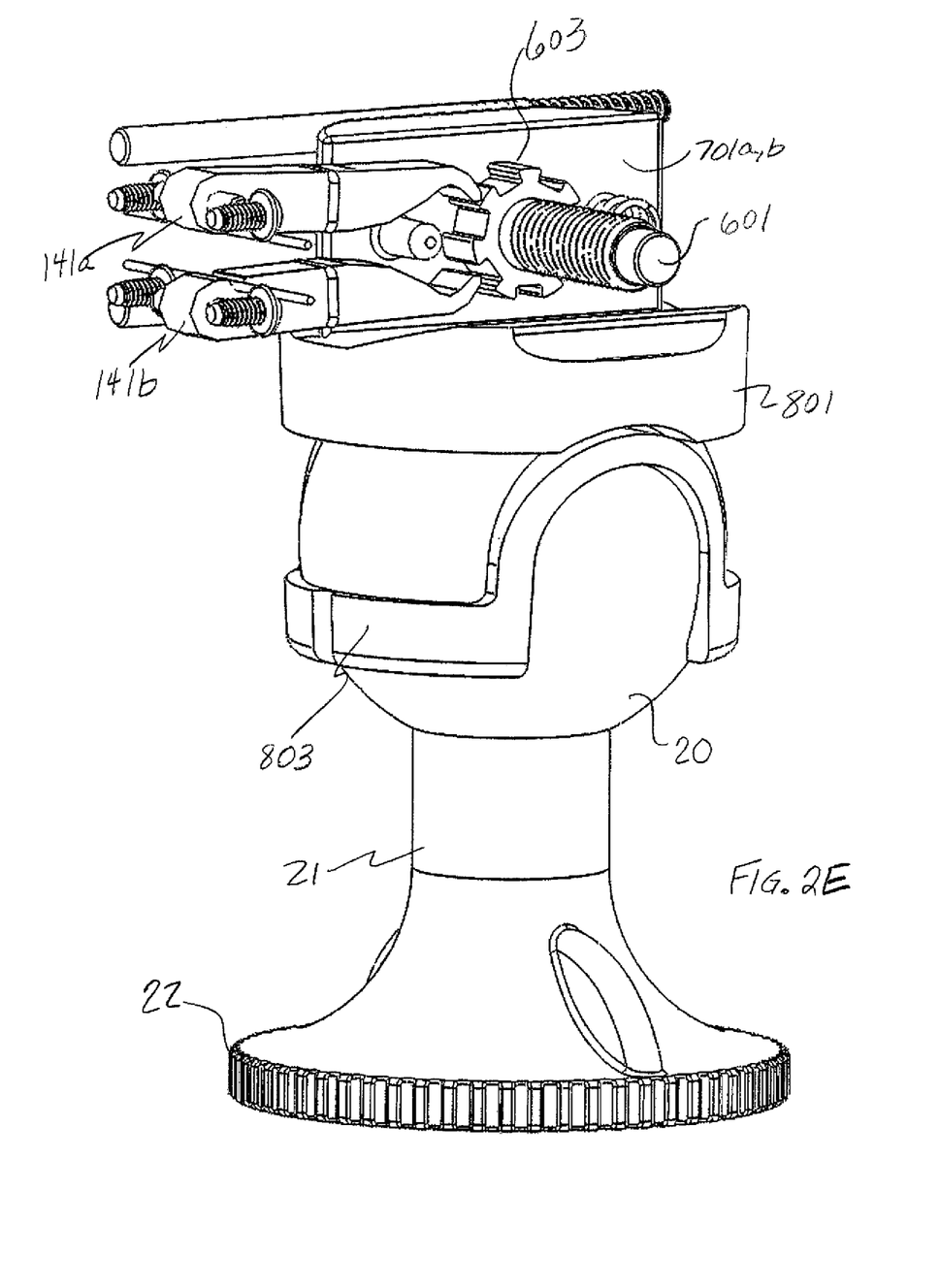
FIG. 2E is a highly simplified cut away isometric view of a portion of a gearing mechanism embodying the invention.

In FIGS. 2C and 2E push button 88a is shown coupled to a pawl arm 141a which is designed to cause a ratchet wheel 603 to rotate (in the embodiment shown in these figures) in a counter-clockwise direction and push button 88b is shown coupled to a pawl arm 141b which is designed to cause the ratchet wheel 603 to rotate in a clockwise (the opposite) direction. Worm rod gear 601 extends through the center of ratchet wheel 603, an equal distance on each side of wheel 603 (See FIGS. 2D, 2E, 2F). Worm gear 601 and wheel 603 may be formed as a single component, or worm gear 601 could be a separate part fixedly attached to wheel 603. Ratchet wheel 603 causes worm rod gear 601 to rotate (clockwise or counter-clockwise) in tandem with the rotation of wheel 603 as per FIGS. 2C, 2D, 2E and 2F.

Figure 2F:
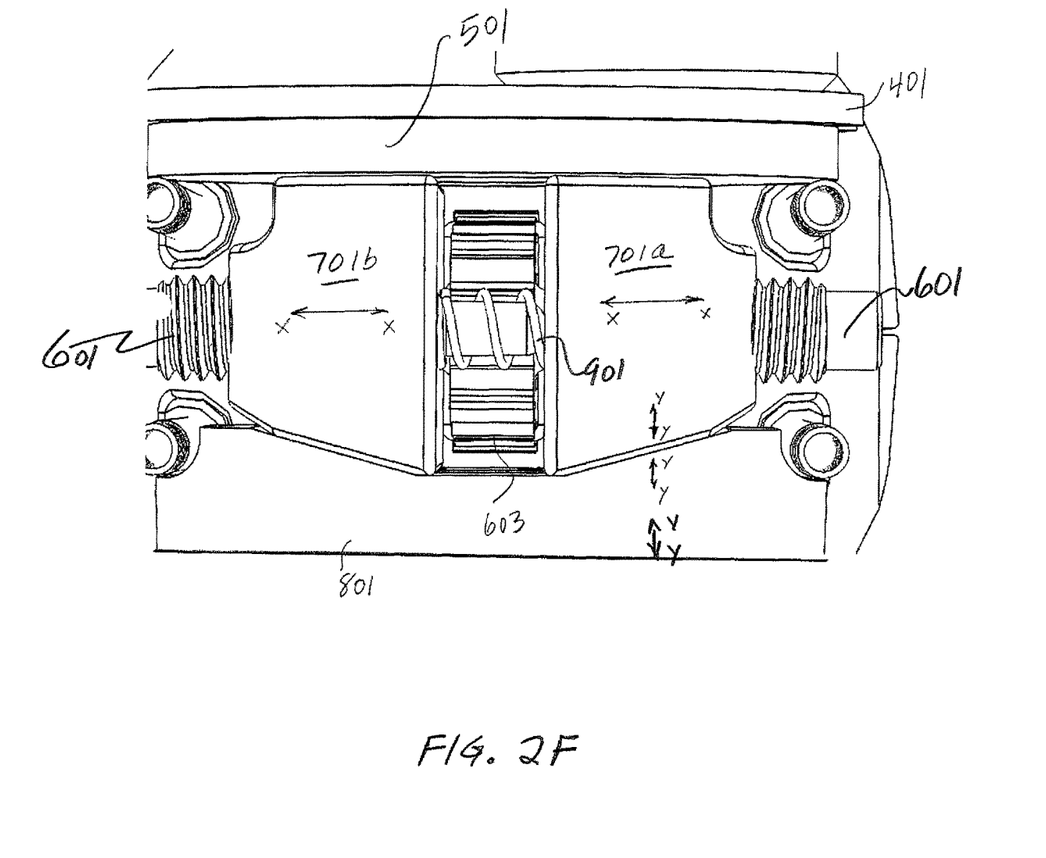
FIG. 2F is a simplified drawing illustrating the use and effect of wedges in practicing the invention.

Two wedges (701a and 701b) have screw threads (see FIG. 2D) which are formed along their central inner core. The wedges (701a and 701b) are meshed with and mounted on and around worm rod gear 601 so that their thread (teeth) mesh with and engage the thread (teeth) of worm gear 601. As worm gear 601 rotates in one direction (e.g., assume the clockwise direction) the two wedges move horizontally (see arrows labeled x-x) outwards (away from each other) causing the ball and housing to tend to be locked or clamped together (see FIG. 2F) as further explained below. As worm gear 601 rotates in the opposite direction (e.g., assume the counter-clock wise direction) the two wedges move horizontally (see arrows labeled x-x) inwards (towards each other) causing the ball and housing to tend to unlock or loosen as, also, further explained below. The two wedge sections (701a, 701b) have an angled (or wedged) underside (bottom region), as shown in FIGS. 2D and 2F, designed to cause: (a) an increasing downward pressure (see vertical arrows labeled y-y) or force to be applied to an underlying "upper" compression cap 801 when the wedges 701a, 701b move outward (away from each other); and (b) a decrease (release) of the downward pressure/force (see vertical arrows labeled y-y) applied to the upper compression cap 801 when the wedges are moved inward (toward each other). When the upper compression cap 801 is pushed down, it pushes down on ball 20 which is then squeezed (wedged) against a lower compression cap 803 and the housing 18 inhibiting movement between the housing and the ball. When the downward pressure on the upper compression cap 801 is decreased, the downward pressure on ball 20 is decreased, tending to allow movement between housing 18 and the ball 20. Thus, the movement (extension or retraction) of the wedges 701a, 701b, enables the application of a compressive force between the swivel ball 20 and the housing 18 to be increased until the two cannot move relative to each other (i.e. are "locked") or the compressive force can be decreased until the two can move freely relative to each other (i.e. are "unlocked").

A significant aspect of the invention is that by pushing on a button (e.g., 88a) with a single finger the ball and housing can be gradually and firmly clamped (locked) to each other and that by pushing a button (e.g., 88b) with a single finger the ball and housing can be gradually allowed to move more or less freely relative to each other. The gearing arrangement (pawl to ratchet wheel to worm gear to the teeth of the wedges) provides mechanical multiplication which enables a single finger to develop and apply the necessary force to provide either firm clamping of the ball and housing or their loosening. By way of example, an embodiment of the invention was designed to enable a user to apply an input force on a button (e.g., 88a) and produce an output (clamping) force between the ball and housing equal to 9 times the input force. Thus, one finger may be used to ensure a firm clamping between the housing and the ball. The number 9 is only by way of example, and the multiplication factor may be increased (or decreased) by modifying the gearing arrangement.

Lock button 88a coupled to pawl 141a may be pressed several times to firmly lock the ball mechanism, and button 88b coupled to pawl 141b may be pressed several times to unlock the ball housing mechanism from the ball. Thus, another significant aspect of the invention is that the tightening and releasing can be done in a few steps (gradually and controllably) by pushing the buttons and enabling adjustments and control of the positioning of the housing (and any camera mounted thereon) before the ball and housing are either firmly locked or unlocked.

Another significant aspect of the invention is that the control (or "clamping") mechanism for locking and unlocking the ball 20 relative to the housing 18 is contained within the housing 18.

A further description of some key components and their functions follows, although already discussed above, with reference to FIGS. 2A-2F and FIG. 3 which is an exploded symbolic view of mechanical components mounted within a housing 18 of the type shown in FIGS. 2A-2F.

Figure 3:
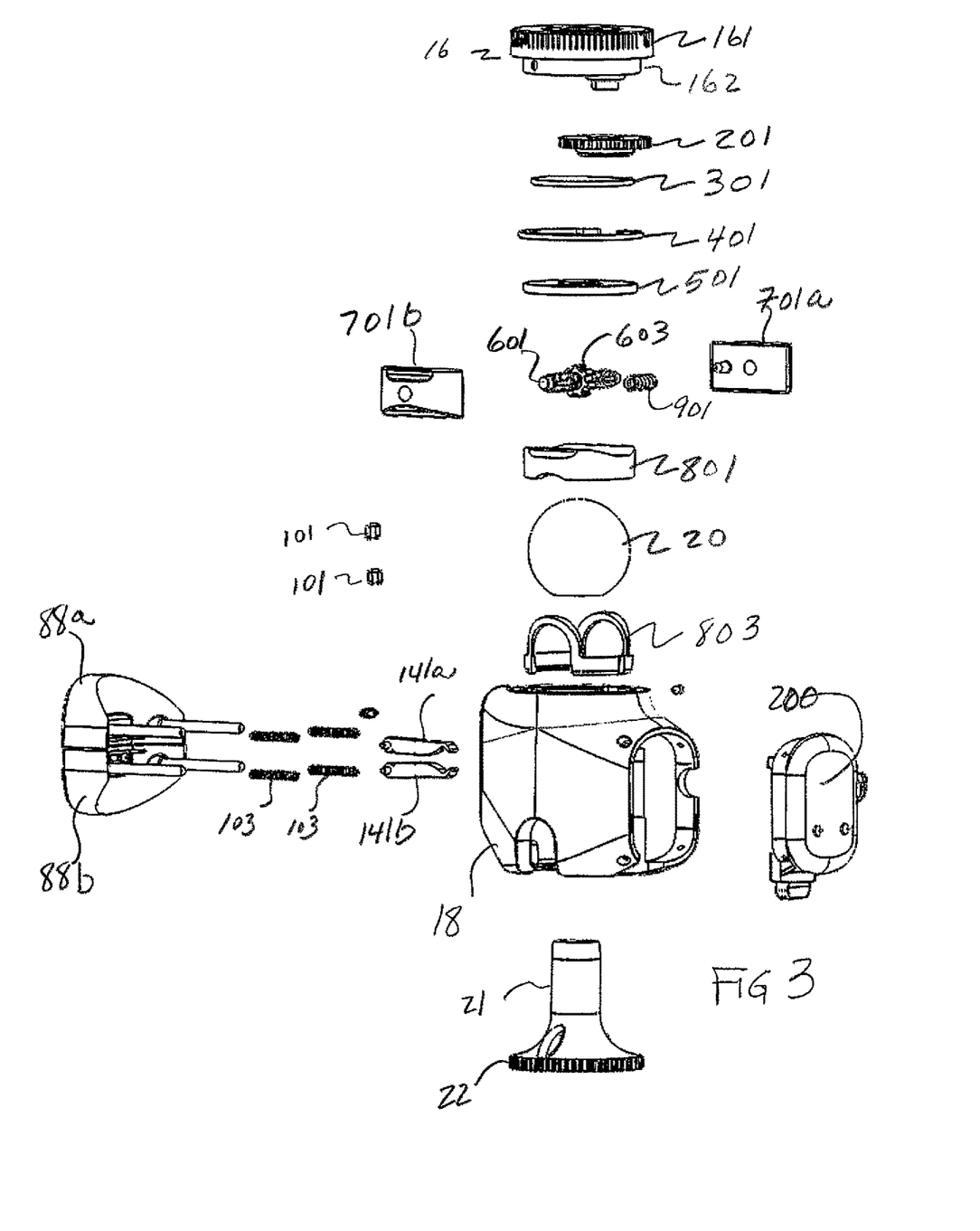
FIG. 3 is an exploded symbolic view of mechanical components contained in, and mounted within, a ball head housing embodying the invention.

1—Panning mechanism 16, to which a camera is intended to be attached, includes a top portion 161 mounted on a base 162 which is attached to the housing 18 via set screws which hold the panning mechanism in housing 18.

2—A thumb wheel 201 located below the panning mechanism, within the housing, is designed to lock and unlock the panning mechanism 16 by rotating the thumbwheel clockwise or counter clockwise.

3—A spacer plate 301, located below the thumb wheel, allows the thumb wheel 201 to rotate properly.

4—A retaining ring 401 locked into a groove formed in the housing 18 keeps the contents of the housing 18, located below it, in place.

5—A reaction plate 501 (header) abutting the retaining ring 401 prevents any upward movement of the wedges 701a, 701b. Consequently, the increase or decrease in pressure (force) caused by the lateral movement of wedge sections 701a, 701b is transmitted directly to underlying "upper" compression cap 801.

6—Push button 88a is coupled/hinged to pawl arm 141a via retaining clips and springs and Push button 88b is likewise coupled/hinged to pawl arm 141b via retaining clips and springs.

(a) When a user pushes button 88a it causes pawl 141a to push down on the gear teeth of ratchet wheel 603 which causes rotation (e.g., counter clockwise) of ratchet wheel 603 and a corresponding rotation of worm gear rod 601. This rotation causes the compression wedges 701a, 701b to move away from each other (extend) tending to clamp (lock) the ball 20 and housing 18 together.

(b) When the user pushes button 88b it causes pawl 141b to push up on the gears of ratchet wheel 603 which causes rotation (e.g., clock wise) of ratchet wheel 603 and a corresponding rotation of gear compression rod 601. This engages the gear worm rod 601 to rotate in the opposite direction causing wedge sections 701a, 701b to move towards each other tending to unclamp (unlock) the housing relative to the ball.

7—Worm rod gear 601, which may also be referred to as a "compression" gear due to its role in the movement of the wedges 701a, 701b, is attached to and driven by "ratchet wheel" 603 whose degree of rotation and direction of rotation is controlled by pawls 141a, 141b in response to push buttons 88a, 88b. Rod 601 has a right hand thread on one side and a left hand thread on the other side to control movement of the wedge sections 701a, 701b. The wedge sections 701a, 701b move laterally (in the horizontal direction in the Figures) along rod 601, as rod 601 rotates. When rod 601 is rotated in one direction it causes the wedge sections 701a, 701b to extend (move outwards—away from each other). When rod 601 is rotated in the opposite direction, to the one direction, it causes the wedge sections 701a, 701b to retract (move inwards-towards each other).

8—Wedge sections 701a and 701b are formed with a bottom inclined surface (i.e., a wedge) and a centrally located threaded (toothed) interior which meshes with the thread (teeth) of worm gear rod 601. When the wedge sections move "outward" or "inward", downward forces are developed due to the movement (extension or retraction) of the wedge sections 701a, 701b. These downward forces are applied to "upper" compression cap 801 which presses on ball 20 to cause an increase or decrease in the mechanical clamping exerted between the ball 20 and the housing 18.

9—Upper compression cap 801 is located below the wedges and is positioned to make direct contact with the top of ball 20. When the compression wedges (701a, 701b) extend, pressure and a downward force are applied to the compression cap 801 which pushes against the ball 20 and a lower compression cap 803 which is generally located about the lower region of the ball 20 and which contacts the housing. Sufficient downward pressure clamps the ball and housing and prevents movement between them. Lower compression cap 803 is essentially two plastic C-shaped curves connected by two arches, formed to be distributed around the opening of housing 18 and ball 20 to prevent dirt particles from entering into the housing. The C-shaped curves are designed to provide adequate friction to fully lock the ball in a selected position, yet smooth enough to allow fine adjustment when partial tension is applied.

10—A tension spring 901 is connected between the compression wedges 701a, 701b to provide a tension force to the gear compression rod 601 to induce friction to keep the gear 601 from freely spinning.

11—A number of retaining clips 101 and springs 103 are coupled/hinged to, and between, push buttons 88a, 88b and pawls 141a, 141b to hold and retain the buttons and pawls within the housing.

12—A printed circuit board (PCB) 200 (see Fogs. 2A, 2B) is attached to housing 18 which aids in enabling a user to level his camera in two directions. The PCB module 200 has a cross pattern of lights that shows the user which way they need to move the assembly in order to proper level the camera. That is, a level sensing and display system is formed on PCB module 200 which may be made so as to be mounted on or fitted within housing 18. PCB 200 includes an electronics module that allows the user to see if the camera is level. This electronics module displays LED lights in a cross pattern enabling the user to easily see when the camera is level.

The combination of components described above and contained in housing 18 functions as a clamping mechanism which enables either (a) compression between the upper compression cap 801 and the lower compression cap 803 to lock the ball head and housing in a selected position; or (b) release of tension between the upper compression cap 801 and the lower compression cap 803 to unlock the ball relative to the housing and allow relatively free movement of the housing.

The swivel ball head lock mechanism embodiment shown in FIGS. 2A-2F and 3 differs from typical prior art in that it is flipped from a typical ball mount, where the ball rotates relative to the housing. In the configuration shown in FIGS. 2A and 2B, a user can mount his camera and lock the ball, then, when panning, the camera will stay at the same relative angle with respect to the earth. This allows the user to do panoramic pans without significant setup time and effort to make sure it stays level.

Ball housings embodying the invention enable a user to clamp the ball to its housing by simply pushing a button one or more times. The freedom of rotation of the housing relative to the ball can be controlled from very tight (totally locked) to very loose over a number of steps. When the user pushes the top button (e.g., 88*a*) it drives a pawl and gear mechanism which applies a force between the housing and the ball tending to lock the ball and the housing preventing movement between these parts. The lock button can be pushed several times to tighten (increase) the clamping force between the housing and the ball in a gradual and controlled manner. To unlock the mechanism, the user simply pushes the bottom button (e.g., 88*b*) one or more times until the housing can move, progressively, from a very tight to a free rotation relative to the ball.

Thus, the swivel ball 20 enables users to manipulate (rotate) their cameras to any selected position. The ball 20 is positioned between an upper compression cap 801 and a lower compression cap 803. The upper cap 801 and the lower cap 803 can be mechanically pressed towards each other to prevent movement of the housing relative to the ball 20. Alternatively, the compression forces between the upper cap 801 and the lower cap 803 can be decreased to enable the housing 18 to move more freely relative to the ball in a gradual and controlled manner.

In the embodiment shown in FIGS. 2A-2F, the upper compression cap 801 is either: (a) pressed down so the ball 20 is compressed between the upper 801 and lower 803 compression caps to lock the housing and ball in position; or (b) allowed to move up so the locking pressure is released and the housing 18 can move relative to the ball 20.

As noted above, in systems embodying the invention, the compression (locking) and release (unlocking) of the upper and lower compression caps is achieved by means of a ratchet and pawl system connected to the shaft of a worm gear to cause rotation of the worm gear.

As noted above, this is in sharp contrast to the prior art which requires the user to typically rotate a knob until the ball properly locks or unlocks.

Applicant's invention has been illustrated for embodiments in which a camera is mounted on a housing which can move relative to a ball held in a fixed position. It should be appreciated that the invention applies as well to systems in which a camera is mounted on a swivel ball which can rotate relative to a base housing held in a fixed position.

Figure 4:
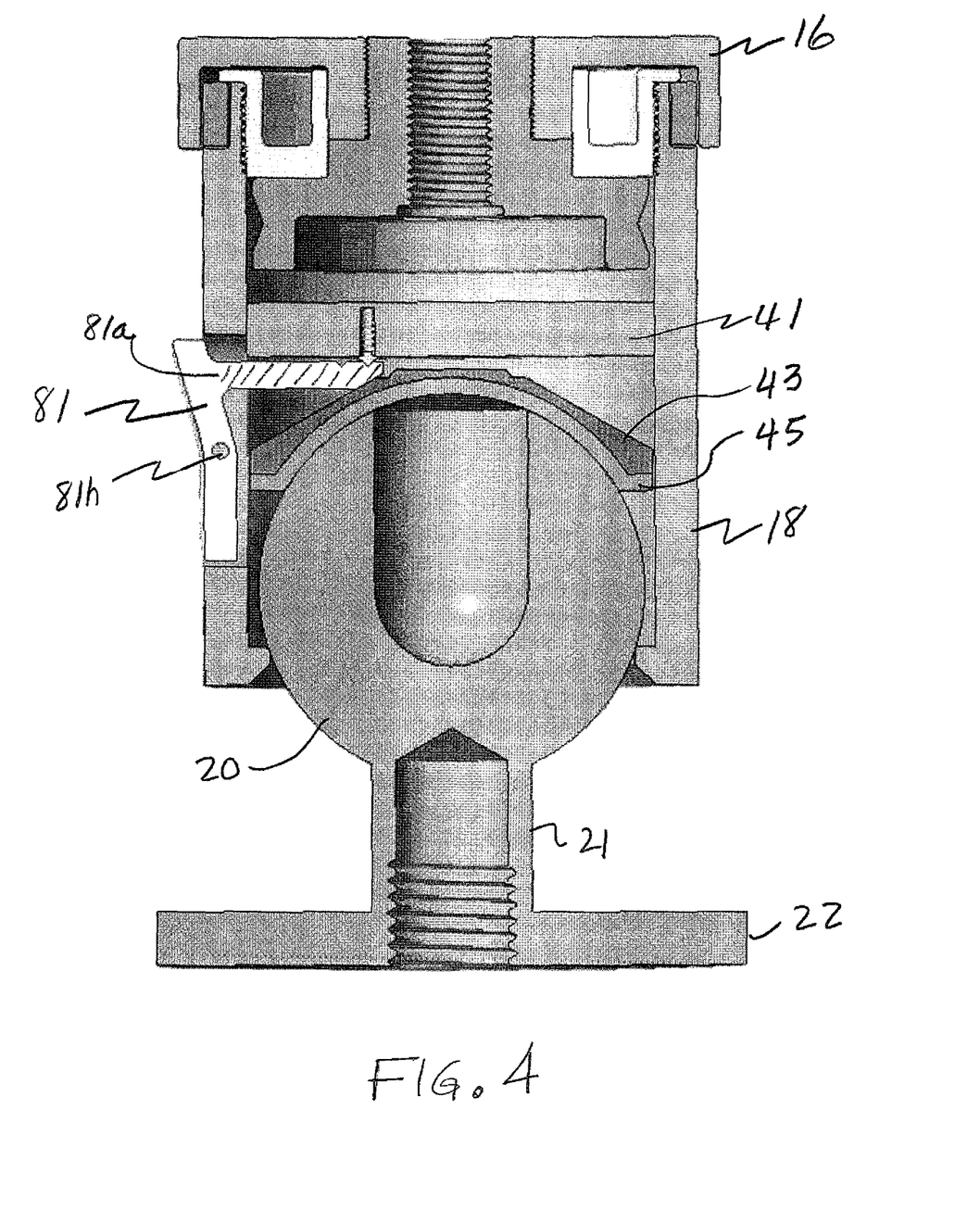
FIG. 4 is a simplified cross sectional diagram of another embodiment of the invention.

FIG. 4 is a cross sectional diagram of another embodiment of the invention. A ball joint 20 is mounted on a stem 21 which rests on a base 22. A ball head housing (housing) 18 is mounted above the ball joint 20 and a pan head 16 is attached to the top of the housing 18. The housing can be rotated and tilted about the ball joint to any desired position and then locked in that position by means of a lock/unlock button 81 which can be operated with one finger pushing on the lock/unlock button. Lock/unlock button 81 which is hinged about hinge 81*h* has a lock mode and an unlock mode. The housing can be released (unlocked) by means of operating button 81 in the unlock (release) mode using one finger.

In the lock mode pushing button 81 causes the top portion 81*a* (shown cross hatched) to advance between header 41 and a metal cap 43. Header 41, which extends horizontally, is fixedly attached to the housing. So, as portion greater 81*a* advances into the housing it applies downward pressure onto metal cap 43. This downward pressure is then simultaneously applied to a cap 45 (which may be of Teflon or any suitable material) which presses down on ball 20. Portion 81*a* can be advanced gradually.

Figure 4A:
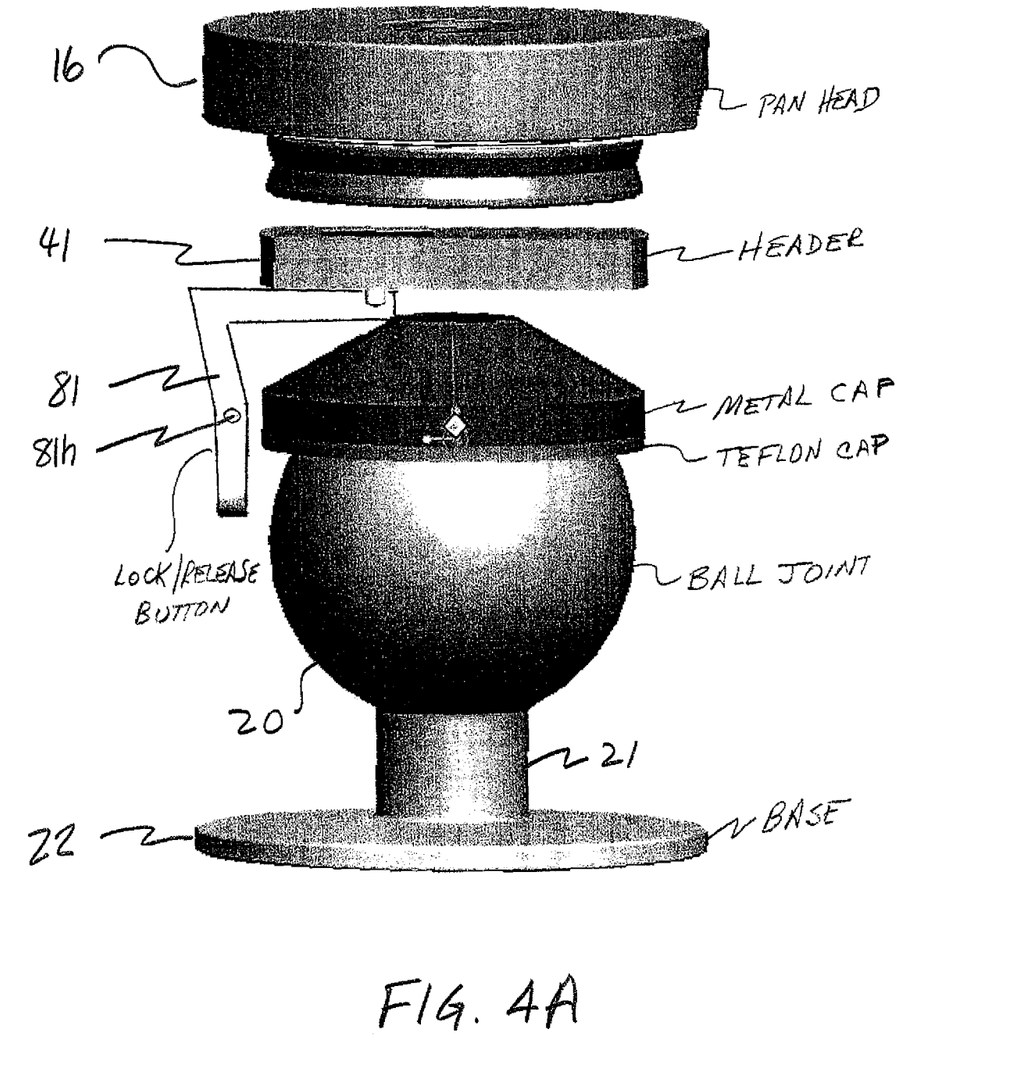
FIG. 4A is a simplified exploded view of some of the components of the embodiment of the invention shown of FIG. 4.

FIG. 4A is an exploded idealized and simplified isometric drawing of some of the internal parts contained in the housing of the embodiment of FIG. 4. There is shown the pan head 16 and it panning mechanism, the header 41 extending generally parallel to the pan head and base, the two operating mode hinged lock/unlock button 81, the metal cap 43 with a ridged conical structure, the underlying cap 45 for transferring pressure to ball 20 mounted on base 20. The lock button 81 can be selectively used, in the lock mode, to apply pressure to the metal and Teflon cap combination to prevent the housing from moving relative the ball joint. Conversely, button 81 is selectively used, in the unlock mode, to release (unlock) the pressure and allow free movement between the housing and the ball joint.

Figures 5A, 5B:
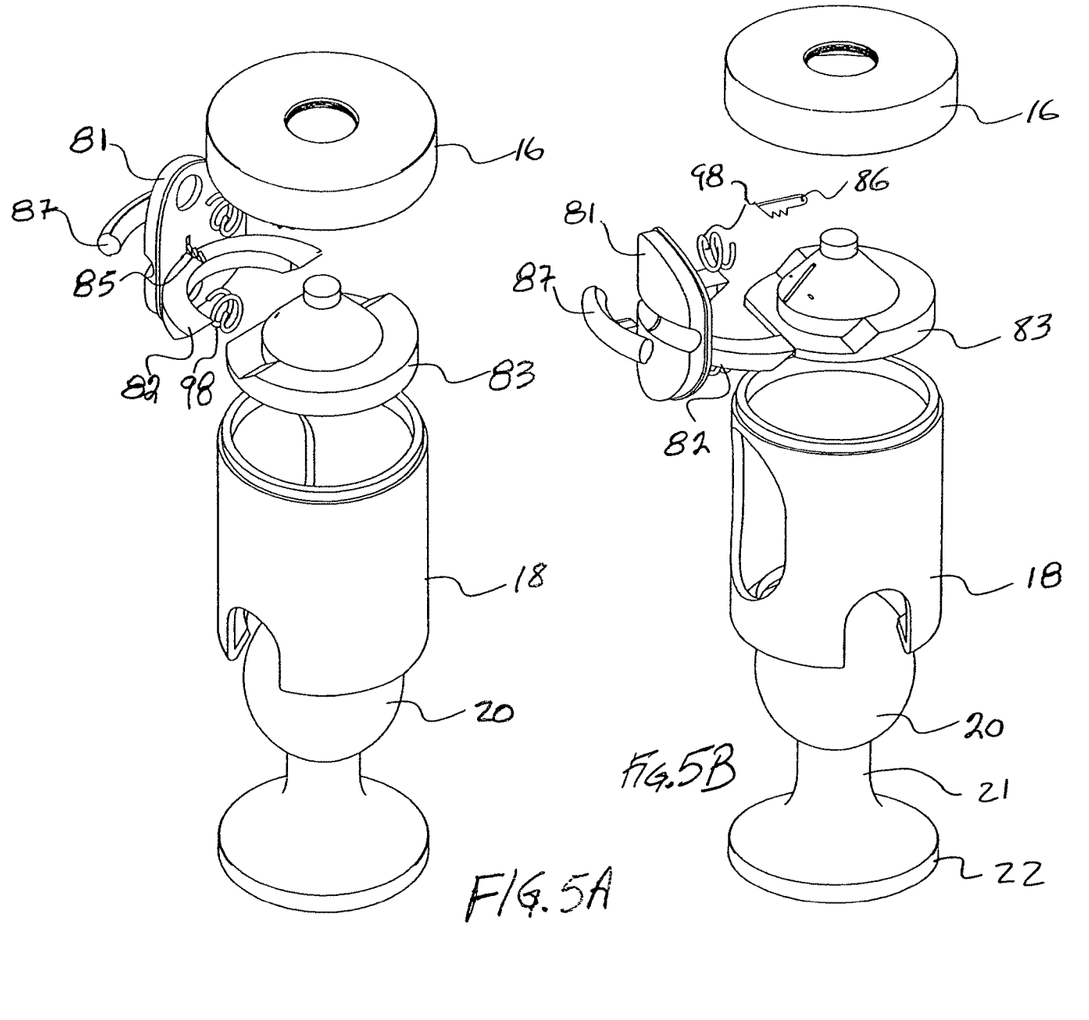
FIGS. 5A and 5B are simplified isometric views of portions of other swivel ball head mounts embodying the invention.
Figure 6A:
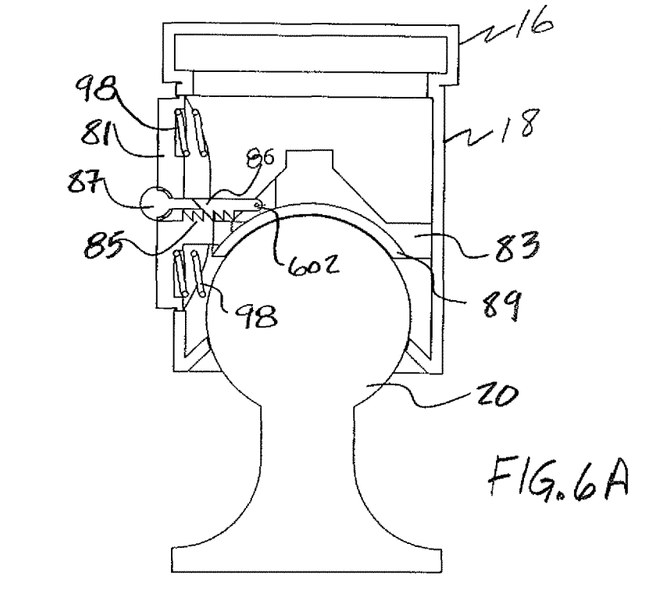
FIGS. 6A, 6B and 6C are different views of the embodiment of FIGS. 5A and 5B.
Figure 6B:
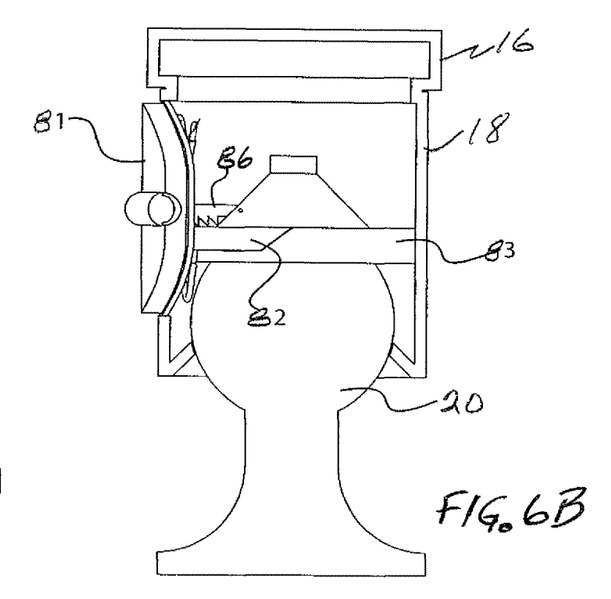
Figure 6C:
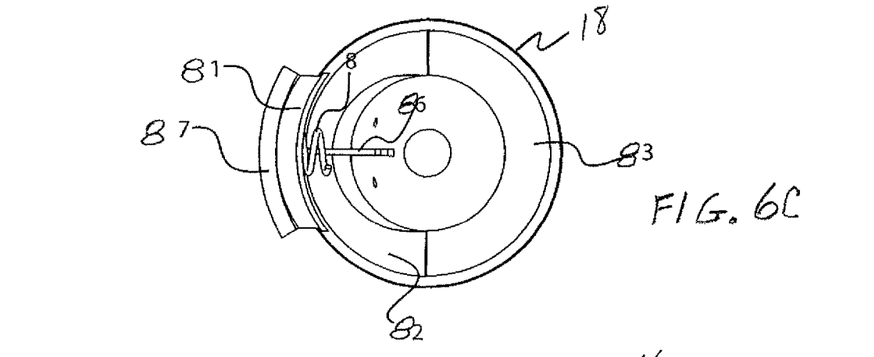

FIGS. 5A and 5B are simplified exploded isometric views of another embodiment of the invention. FIGS. 6A and 6B are simplified vertical cross sectional diagrams of the embodiment shown in FIGS. 5A and 5B and FIG. 6C is a horizontal cross sectional diagram through a region along the top portion of the housing 18. These drawings show the lock/unlock buttons and associated spring mechanism which can be used to lock and unlock the camera mount using just one finger. For purpose of explanation a description of the following parts and their functions are set forth below:

1. Component 81 represents a selectively operated main spring loaded locking (clamping) button.
2. Component 82 represents a horseshoe shaped pressure bar and bevels incorporating a locking ratchet and beveled ends to push against a metal cap 83 and apply the desired pressure thereto.
3. Component 83 represents a metal cap and component 89 represents a cap 45 located between the metal cap and the ball joint 20. The metal cap and cap 45 are used to apply pressure to the ball joint preventing relative motion between the ball joint and the ball head housing 18 when the device is in a lock mode.
4. Component 20 is a ball joint mounted on a ball stem above a base structure.
5. Component 85 represents a part (ratchets) of the locking/release mechanism mounted on member 82.
6. Component 86 represents a hinged locking/unlocking arm and ratchet.
7. Component 87 represents an unlocking (release) button. When component 87 is pushed inwards it functions to lift a bevel which allows associated springs to be released and button 81 to pop out.
8. Component 98 represents springs associated with button 81 and which function to lock the ball joint and housing, when the button 81 is depressed (i.e., pushed inwards).
9. Component 16 is a pan head and may include a rotating mechanism (not shown).
10. Component 18 is the ball head housing.

When the lock button 81 is pressed inward it causes arm 82 and its ratchet 85 to advance inward and press against an edge of the metal cap 83, which in combination with cap 89 functions as a tension brake. This causes metal cap 83 to press against Teflon cap 89 which in turn presses against ball joint 20. This creates friction impeding free movement. The friction is maintained by the ratchet 85 interacting with a complementary ratchet arrangement 86. The ratchet 85 is held fixed in place by the ratchet arm (86) attached (hinged at 602) to the metal cap 83 which with cap 89 functions as a tension brake (83). The ratchet arm (86) can be released by pressing the ratchet release button (87). Pressing the release button 87 causes the arm 86 to lift allowing the compressed springs 98 to push out. Note the springs 98 had been put under tension previously when button 81 was pushed in.

It is thus shown that a lock/release button which can be activated by a finger of one hand can be used to activate a spring loaded mechanism which can either lock the ball joint in place relative to the ball head housing or release the ball head housing relative to the ball joint so it/they can rotate freely relative to each other. The invention has been illustrated using particular mechanical mechanisms. However, it should be appreciated that other control and clamping mechanisms may be used to lock or release the swivel ball relative to the ball housing, where the control mechanisms can be operated with a single finger pressing on a lock/release mechanism.

An advantage of using mechanical components is that no batteries are needed to operate the system since battery failure would be problematic under many operating conditions.

However, it should be appreciated that the clamping mechanism may include an electro-mechanical or electro-magnetic device to effectively and selectively lock and/or unlock the ball joint and housing control by means of a set/reset button operable with a single finger.

What is claimed is:
1. An apparatus for a camera system comprising:
   a ball;
   a housing having an opening adapted to receive a portion of said ball which extends within said opening into the interior of said housing and wherein said ball and said housing are mechanically coupled to each other to enable the housing and ball to be rotated and tilted with respect to each other;
   a clamping mechanism located within the housing coupled between the ball and an interior wall of the housing for selectively blocking or unblocking movement between the housing and the ball; and
   a push button mechanism coupled to the clamping mechanism, operable with a single finger, to selectively activate the clamping mechanism with a single finger to restrict and prevent movement between the ball and said housing and to selectively activate the clamping mechanism with a single finger to release the ball relative to said housing and enable movement between the ball and said housing.

2. The apparatus as claimed in claim 1, wherein said clamping mechanism is located entirely within said housing; and wherein said push button mechanism includes a lock button for inhibiting motion between the ball and the housing and an unlock button for enabling motion between the ball and the housing.

3. The apparatus as claimed in claim 1 wherein said clamping mechanism includes a compression cap covering the portion of the ball extending within the housing and a gear arrangement extending between the housing and the compression cap.

4. The apparatus as claimed in claim 3 wherein said gear arrangement includes: (a) a ratchet wheel responsive to said lock and unlock push buttons being pushed; (b) a worm gear attached to said ratchet wheel and responsive to movement of the ratchet wheel; and (c) a wedging device coupled to the worm gear and responsive to motion of the worm gear for applying increasing pressure to the compression cap to inhibit movement between the housing and the ball or for applying decreasing pressure to the compression cap for enabling movement between the housing and the ball.

5. The apparatus as claimed in claim 3 wherein said push buttons are coupled via an arm to said ratchet wheel; and wherein the lock push button causes the ratchet wheel to rotate in one direction and the unlock button causes the ratchet wheel to rotate in the opposite direction, to said one direction.

6. The apparatus as claimed in claim 3 wherein said gear arrangement includes a ratchet wheel which rotates progressively, in response to said lock and unlock push buttons being pushed, to produce either a gradual increase in the blocking pressure applied between the housing and the ball or a gradual decrease in the blocking pressure applied between the housing and the ball.

7. The apparatus as claimed in claim 1 wherein said clamping mechanism includes a compression cap covering the portion of the ball extending within the housing; a reaction plate extending within the housing generally parallel to the compression cap and fixedly attached to the housing; and a gear arrangement extending between the reaction plate and the compression cap.

8. Apparatus as claimed in claim 1 wherein said clamping mechanism is fully contained within the housing and wherein said housing has an outside wall and wherein said lock push button and said unlock push button extend along the outer wall of the housing with minimum protrusion.

9. Apparatus as claimed in claim 1 wherein said clamping mechanism coupled between the ball and the housing for selectively blocking or unblocking movement between the housing and the ball includes a gear mechanism responsive to said push buttons being pushed for amplifying forces due to the push buttons enabling a small force, such as is exercised by a single finger, to apply a much larger clamping force between the ball and the housing.

10. Apparatus as claimed in claim 1, wherein said housing includes panning apparatus and means for attaching a camera to the panning apparatus and wherein said ball is mounted via a stem onto a base.

11. An apparatus for a camera system comprising:
   a ball;
   a housing mounted about said ball and coupled thereto to enable the housing and ball to be rotated and tilted with respect to each other; and
   a clamping mechanism, located within the housing, coupled between the ball and the housing for selectively blocking or unblocking movement between the housing and the ball; where the clamping mechanism includes a lock and unlock mechanism including a gearing mechanism which can be selectively activated with a single finger to restrict and prevent movement between the ball and said housing and which can be selectively activated with a single finger to release the ball relative to said housing and enable movement between the ball and said housing.

12. Apparatus as claimed in claim 11, wherein said lock and unlock mechanism includes a lock button and an unlock button, and wherein said lock button and unlock button are operable independently of each other; and wherein said clamping mechanism can be selectively activated with a single finger to gradually restrict and prevent movement between the ball and said housing and can be selectively activated with a single finger to gradually release the ball relative to said housing and enable movement between the ball and said housing.

13. Apparatus as claimed in claim 11, wherein said clamping mechanism includes a pawl and ratchet wheel system activated by said lock and unlock buttons.

14. Apparatus as claimed in claim 13, wherein said pawl and ratchet wheel system is coupled to and drives a worm gear which controls the freedom of movement between the ball and said housing.

15. Apparatus as claimed in claim 14 wherein said clamping mechanism includes a compression cap coupled between the housing and the ball; and wherein said worm gear is coupled to a wedge component to control the movement of said wedge component and wherein the wedge component is positioned between a reaction plate and said compression cap to cause said compression cap to either: (a) apply a gradually increasing restrictive force between said ball head and the housing to impede movement between them; or (b) apply a gradually increasing releasing force between said ball and the housing to enable easy movement between them.

16. Apparatus as claimed in claim 11, wherein said lock and unlock mechanism includes a lock button and an unlock button, and wherein said lock button and unlock button are push buttons operable by a single finger.

17. Apparatus as claimed in claim 16, wherein said housing has an outside wall and wherein said lock push button and said unlock push buttons extend along the outer wall of the housing with minimum protrusion.

18. Apparatus as claimed in claim 11 including push buttons for activating said clamping mechanism and wherein said gearing mechanism is responsive to said push buttons being pushed for enabling a small force, such as is exercised by a single finger, to apply a much larger clamping force between the ball and the housing.

19. Apparatus as claimed in claim 11 wherein said clamping mechanism is fully contained within the housing and wherein said housing has an outside wall and wherein said lock push button and said unlock push buttons extend along the outer wall of the housing with minimum protrusion.

20. A mount for a camera system comprising:
a swivel ball;
a housing for the swivel ball having an opening adapted to receive a portion of said swivel ball and for enabling movement between the swivel ball and the housing;
a clamping mechanism coupled between the swivel ball and the housing for selectively locking or unlocking the swivel ball relative to the housing; where the clamping mechanism includes: (a) a gearing arrangement and also includes a lock button coupled to the gearing arrangement which can be selectively depressed with a finger to activate the gear arrangement to prevent movement between the swivel ball and the housing; and (b) an unlock button coupled to the gearing arrangement which can be selectively depressed with a single finger to activate the gear arrangement to release the swivel ball relative to the housing and enable movement between the swivel ball and the housing.

* * * * *